(12) United States Patent
Janning

(10) Patent No.: US 9,433,057 B1
(45) Date of Patent: Aug. 30, 2016

(54) RESISTIVE PROTECTION TO PREVENT REVERSE VOLTAGE BREAKDOWN IN ANTI-PARALLEL WIRED LEDS

(71) Applicant: JLJ, Inc., Bellbrook, OH (US)

(72) Inventor: John L. Janning, Bellbrook, OH (US)

(73) Assignee: JLJ, Inc., Bellbrook, OH (US)

( * ) Notice: Subject to any disclaimer, the term of this patent is extended or adjusted under 35 U.S.C. 154(b) by 0 days.

(21) Appl. No.: 15/008,213

(22) Filed: Jan. 27, 2016

Related U.S. Application Data

(60) Provisional application No. 62/258,503, filed on Nov. 22, 2015, provisional application No. 62/260,505, filed on Nov. 28, 2015, provisional application No. 62/262,779, filed on Dec. 3, 2015, provisional application No. 62/262,994, filed on Dec. 4, 2015.

(51) Int. Cl.
*H05B 33/08* (2006.01)
*H05B 37/00* (2006.01)

(52) U.S. Cl.
CPC ........ *H05B 33/089* (2013.01); *H05B 33/0821* (2013.01)

(58) Field of Classification Search
CPC .......................... H05B 33/089; H05B 33/0821
USPC ........................................................ 315/122
See application file for complete search history.

(56) References Cited

U.S. PATENT DOCUMENTS

| | | | | |
|---|---|---|---|---|
| 9,022,608 B2* | 5/2015 | Stack | ........................ | F21S 4/20 315/122 |
| 2002/0043943 A1 | 4/2002 | Menzer et al. | | |
| 2007/0222299 A1* | 9/2007 | Pickett | ...................... | H02J 3/01 307/105 |
| 2007/0273299 A1* | 11/2007 | Miskin | ............... | H05B 33/0818 315/250 |
| 2008/0024071 A1* | 1/2008 | Yu | ...................... | H05B 33/0803 315/192 |
| 2008/0284343 A1* | 11/2008 | Kuo | ......................... | F21K 9/00 315/185 R |
| 2009/0091263 A1* | 4/2009 | Janning | ............... | H05B 33/0821 315/122 |
| 2011/0187279 A1* | 8/2011 | Radermacher | ..... | H05B 33/0821 315/251 |
| 2011/0210677 A1* | 9/2011 | Hering | ............... | H01R 13/6641 315/185 R |
| 2012/0212144 A1* | 8/2012 | Hayashi | ............... | H05B 33/089 315/193 |
| 2014/0042903 A1 | 2/2014 | Altamura | | |
| 2014/0292212 A1* | 10/2014 | Gray | .................. | H05B 33/0818 315/186 |
| 2014/0320043 A1* | 10/2014 | Radermacher | ..... | H05B 33/0845 315/307 |
| 2015/0015149 A1* | 1/2015 | Zhang | ................ | H05B 33/0821 315/192 |
| 2015/0230409 A1* | 8/2015 | Nicole | .................. | A01G 7/045 47/17 |
| 2016/0095180 A1* | 3/2016 | Miskin | ............... | H05B 33/0815 315/185 R |

* cited by examiner

*Primary Examiner* — Dylan White
(74) *Attorney, Agent, or Firm* — Blank Rome LLP

(57) ABSTRACT

A dual color series-wired LED light string formed of a plurality of sockets, each of which receives an LED housing containing a pair of LEDs connected in anti-parallel configuration. Each LED socket includes a protective resistive component which is electrically connected across each pair of anti-parallel LEDs of the respective LED housing to protect each LED of the pair from reverse voltage breakdown damage in the event of a failure of the other LED in the housing. The protective resistive component also further serves as a shunt to electrically bypass a failed LED to keep the remaining LEDs in the light string fully illuminated.

8 Claims, 3 Drawing Sheets

RESISTIVE PROTECTION TO PREVENT REVERSE VOLTAGE BREAKDOWN IN ANTI-PARALLEL WIRED LEDS

This application claims priority to U.S. Provisional Application No. 62/258,503, filed Nov. 22, 2015, U.S. Provisional Application No. 62/260,505, filed Nov. 28, 2015, U.S. Provisional Application No. 62/262,779, filed Dec. 3, 2015, and U.S. Provisional Application No. 62/262,994, filed Dec. 4, 2015, the disclosures of which are herein incorporated by reference.

FIELD OF THE INVENTION

The present invention relates to a series connected light string and, more particularly to an LED light string with anti-parallel wired LED pairs connected in electrical series for dual-color holiday lighting.

BACKGROUND OF THE INVENTION

Light Emitting Diode (LED) light strings have become quite popular recently for Christmas holiday decorating. They are much more energy efficient than incandescent lighting that has been around for many years. Since both the LED and the more conventional incandescent mini-light operate at very low voltage—usually between 2.0 to 3.5 volts—they are wired in electrical series connection with approximately 35 to 50 lights in a light string. As with incandescent lighting, when an LED bulb burns out or otherwise fails, the entire series light string goes out. To prevent this, bypass shunts can be wired across each LED to continue current through the light string in the event of such a failure. Such shunts are often resistive shunts, such as disclosed in U.S. Pat. Application No. 2014/0042903.

The latest trend in pre-lit Christmas trees is two color trees. This is where the consumer may choose clear (white) lights or multi-color lights to illuminate the Christmas tree. Inside each LED housing 2 is two LED's 4, 6—one clear and one color—connected in anti-parallel, as shown in FIG. 1. Such anti-parallel LED pairs are provided in a series wired circuit so that all clear LED's (oriented in one direction) are connected in electrical series and all multi-colored LED's (oriented in an opposite direction) are so wired. Selecting which color the tree will illuminate is easy. This can be done by flipping a switch 8, as shown in FIG. 2.

A bridge rectifier 10 provides full wave low flicker rectification to the LEDs. When current flows in one direction, the clear lights illuminate. When the polarity is switched, the current flows in the opposite direction, illuminating the multi-colored LED's. Because the voltage to the multi-colored LED's average lower than the clear lights, a series resistor 12 is inserted in the multi-color circuit. This series resistor can be shunted by a rectifier diode (D1) 14 (FIG. 2) which also may have a series resistor in series with it. This means keeps the proper current flowing in the circuit.

While LED's claim a long life, they do sometimes fail. When they are connected anti-parallel as shown in FIG. 1, each LED protects the companion LED in that housing from reverse voltage breakdown. When an LED fails, it no longer can protect its companion LED and that LED is damaged, and both colored light strings go out.

Accordingly, it would be desirable to provide a circuit for anti-parallel LEDs which protects the companion LED of each anti-parallel pair from reverse voltage breakdown in the event of failure of one of the two LEDs, thereby allowing a light string formed of anti-parallel LEDs to remain lit.

SUMMARY OF THE INVENTION

The present invention utilizes a unique and novel resistive shunt not used or considered before for anti-parallel LEDs in a series wired light string. The resistive shunt across each pair of anti-parallel LEDs not only keeps the current flowing in the direction of the failed LED (so that the other LEDs of same color in the string remain lit), but it also advantageously protects the companion LED from reverse voltage damage, thereby preventing failure of the entire light string.

Other advantages, variations and other features of the invention will become apparent from the drawings, the further description of examples and the claims to follow.

DETAILED DESCRIPTION OF THE PREFERRED EMBODIMENTS

Figure 1:
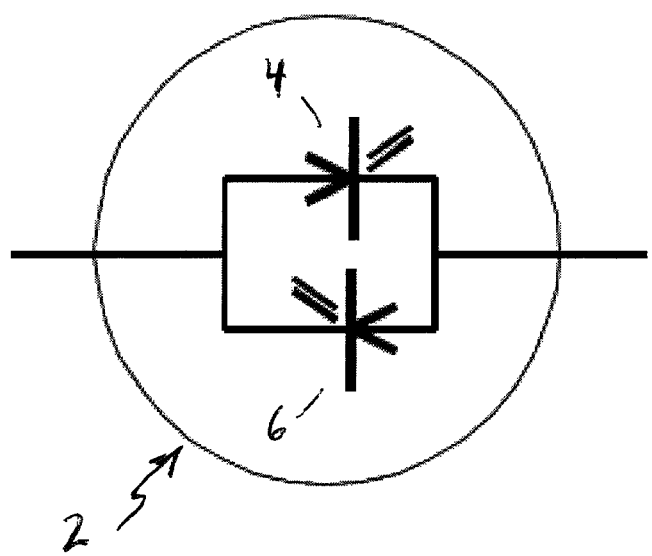
FIG. 1 shows two LEDs connected in an anti-parallel configuration.
Figure 2:
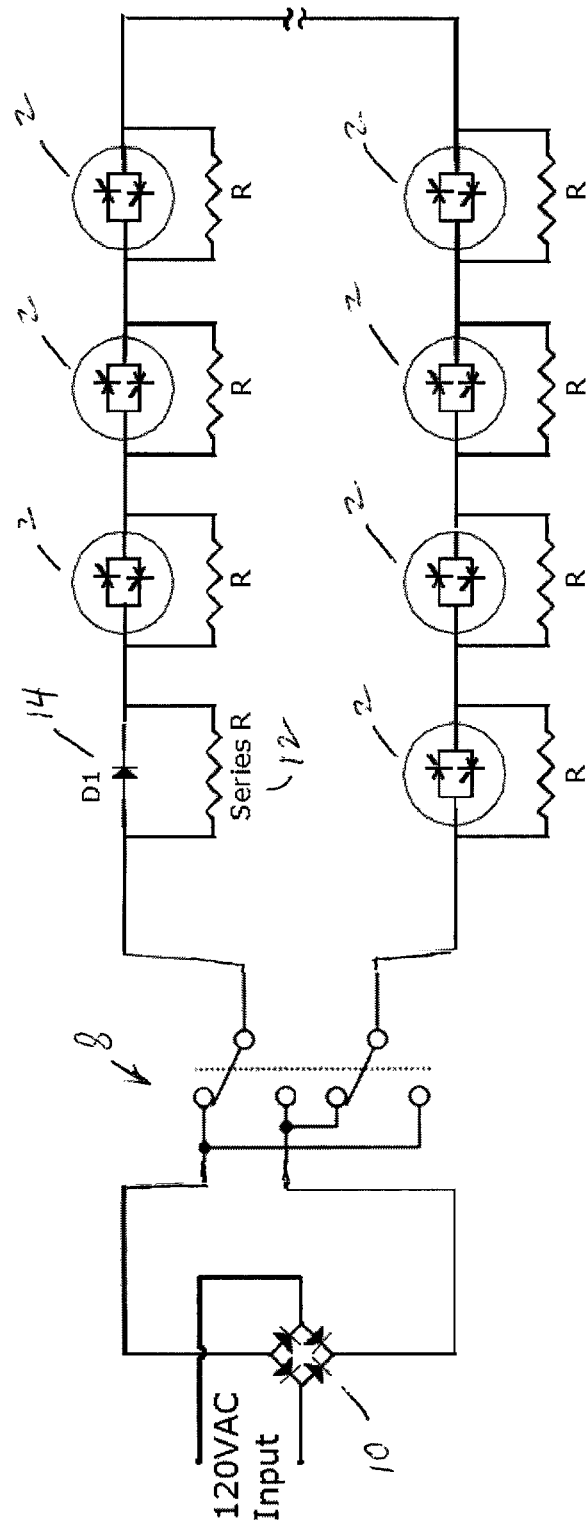
FIG. 2 a light string with a series of anti-parallel LED pairs, including a resistive shunt to protect against reverse voltage breakdown.
Figure 3:
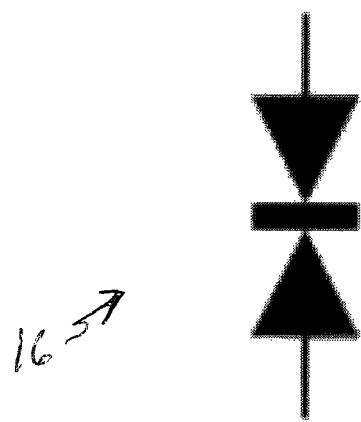
FIG. 3 shows a transient voltage suppressor (TVS) device which can be used as a resistive shunt in the present invention.

With reference to FIG. 2, to protect the companion LED of each pair of anti-parallel LEDs from reverse voltage breakdown, the circuit of the present invention advantageously includes a resistive component R such as a resistor; NTC (negative temperature coefficient) thermistor, a TVS (transient voltage suppressor) 16 (see FIG. 3), or a metal oxide varistor (MOV) connected across the terminals of the LEDs or preferably inside the LED socket.

In the event of a failure of one of the LEDs in each pair of anti-parallel LEDs, the resistive shunt not only keeps the current flowing in the direction of the failed LED (so that the other LEDs of same color in the circuit remain lit), but it also advantageously protects the companion LED from reverse voltage damage.

By way of further explanation, with the parallel connected protective resistive component of the present invention, the dual color Christmas light string operates normally. Each LED in the LED housing protects the other (companion) LED from reverse voltage breakdown damage. However, if an LED goes out, that LED itself goes out. All of the others stay lit. While the bad LED no longer protects its companion, the parallel connected protective resistive component protects the companion LED from reverse voltage damage. The entire series wired string of that color is thus unaffected by the failure of a single LED.

Although the invention has been described in detail in connection with the exemplary embodiments, it should be understood that the invention is not limited to the above disclosed embodiments. Rather, the invention can be modified to incorporate any number of variations, alternations, substitutions, or equivalent arrangements not heretofore described, but which are commensurate with the spirit and scope of the invention. For example, as described above, when two LED chips are placed in an anti-parallel configuration in the same housing, they would usually be of different colors. However, in some cases, they may be the same color.

Accordingly, the invention is not limited by the foregoing description or drawings, but is only limited by the scope of the appended claims.

What is claimed is:

1. A dual color series-wired LED light string comprising:
   a plurality of LED housings each containing a pair of LEDs connected in anti-parallel configuration,
   a current limiting resistor disposed in series with the plurality of LEDs to control the current in the light string, wherein the current limiting resistor is shunted by a diode,
   and
   a protective resistive component connected across each pair of anti-parallel LEDs to protect each LED of the pair from reverse voltage breakdown damage in the event of a failure of the other LED in the housing.

2. A dual color series-wired LED light string as recited in claim 1, wherein the protective resistive component is disposed in a socket for receiving the LED housing.

3. A dual color series-wired LED light string as recited in claim 1, wherein, in the event of a failure of an LED in the housing, the protective resistive component further serves as a shunt to electrically bypass the failed LED and keep the remaining LEDs in the light string fully illuminated.

4. A dual color series-wired LED light string as recited in claim 1, wherein the protective resistive component is a resistor.

5. A dual color series-wired LED light string as recited in claim 1, wherein the protective resistive component is an NTC thermistor.

6. A dual color series-wired LED light string as recited in claim 1, wherein the protective resistive component is a transient voltage suppressor.

7. A dual color series-wired LED light string as recited in claim 1, wherein the protective resistive component is a metal oxide varistor (MOV).

8. A dual color series-wired LED light string as recited in claim 1, further comprising a series resistor connected in series with the diode, such that the diode and the series resistor shunt the current limiting resistor.

* * * * *